United States Patent [19]
Brady et al.

[11] Patent Number: 5,644,791
[45] Date of Patent: Jul. 1, 1997

[54] SYSTEM FOR STORING POINTERS TO INITIAL SECTORS OF VARIABLE LENGTH N UNITS AND STORING SECOND POINTERS WITHIN THE INITIAL SECTOR OF THE N UNIT

[75] Inventors: James T. Brady; Joe-Ming Cheng, both of San Jose, Calif.; Oded Cohn, Haifa, Israel; James W. Eldridge, San Jose, Calif.; Yoram Novick, Haifa, Israel; Norman K. Ouchi, San Jose, Calif.; Danit Segev, Haifa, Israel

[73] Assignee: International Business Machines Corporation, Armonk, N.Y.

[21] Appl. No.: 241,982

[22] Filed: May 11, 1994

[30] Foreign Application Priority Data

Nov. 30, 1993  [JP]  Japan ................... 5-299290

[51] Int. Cl.⁶ ........................................ G06F 13/00
[52] U.S. Cl. ................. 395/888; 395/439; 395/441
[58] Field of Search ........................... 364/222.81, 298, 364/252.3, 260.8, 962, 238.3; 395/828, 840, 439, 441, 600, 888

[56] References Cited

U.S. PATENT DOCUMENTS

| | | | |
|---|---|---|---|
| 4,611,272 | 9/1986 | Lomet | 364/200 |
| 4,611,298 | 9/1986 | Schuldt | 364/900 |
| 4,758,977 | 7/1988 | Morimoto et al. | 364/900 |
| 4,843,389 | 6/1989 | Lisle et al. | 341/106 |
| 4,866,687 | 9/1989 | Kasai et al. | 369/32 |
| 5,135,289 | 8/1992 | Yoshida et al. | 341/67 |
| 5,155,484 | 10/1992 | Chambers, IV | 341/55 |
| 5,231,593 | 7/1993 | Notess | 364/550 |
| 5,237,460 | 8/1993 | Miller et al. | 360/8 |
| 5,243,543 | 9/1993 | Notess | 364/550 |
| 5,267,165 | 11/1993 | Sirat | 364/419.11 |

(List continued on next page.)

OTHER PUBLICATIONS

M. Rosenblum et al., "The Design and Implementation of a Log-Structured File System", ACM Transactions on Computer Systems, vol. 10, No. 1, Feb/1992, pp. 26-52.

D. Patterson et al., "A Case For Redundant Arrays of Inexpensive Disks (RAID)", ACM Sigmod Conference, Chicago Illinois, Jun. 1-3, 1988, pp 109-116.

Primary Examiner—Thomas C. Lee
Assistant Examiner—Anderson I. Chen
Attorney, Agent, or Firm—Ohlandt, Greeley, Ruggiero & Perle

[57] ABSTRACT

A method for operating a data storage system that is comprised of at least one disk. The method includes a step of partitioning a data compression unit into n basic compression units, where n is greater than one. Each data compression unit is comprised of a plurality of disk sectors and each of n basic compression units begins with a different initial sector. A next step partitions the data compression unit into X intervals, where X is less than n. Each of the X intervals begins with a different initial sector and within one of the n basic compression units. Further steps of the method include storing, external to the at least one disk, a plurality of first pointers each of which points to the initial sector of one of the n basic compression units wherein the 1/X, 2/X, ..., (X−1)/X intervals begin; storing, within each of the initial sectors of the individual ones of the n basic compression units wherein the 1/X, 2/X, ..., (X−1)/X intervals begin, a second pointer to the initial sector of the interval that begins within the basic compression unit; and, in response to a disk read operation that reads a compressed data unit that begins with one of the sectors that is located within one of the X intervals, accessing the beginning sector of the compressed data unit in accordance with one of the first pointers and one of the second pointers. The step of allocating includes a step of determining an actual compression ratio for the record, determining a value of a longest run of identical characters within the record, and adjusting the actual compression ratio based on the value of the longest run of identical characters. The step of allocating also includes a step of adding at least one additional sector to the estimated number to enable the compressed record to be subsequently updated in place.

19 Claims, 3 Drawing Sheets

U.S. PATENT DOCUMENTS

| | | | |
|---|---|---|---|
| 5,270,712 | 12/1993 | Iyer et al. | 341/50 |
| 5,305,295 | 4/1994 | Chu | 369/30 |
| 5,333,277 | 7/1994 | Searls | 395/325 |
| 5,333,313 | 7/1994 | Heising | 395/600 |
| 5,355,481 | 10/1994 | Sluijter | 395/600 |
| 5,374,916 | 12/1994 | Chu | 340/146.2 |
| 5,481,701 | 1/1996 | Chambers, IV | 395/600 |
| 5,481,704 | 1/1996 | Pellicano | 395/600 |

SYSTEM FOR STORING POINTERS TO INITIAL SECTORS OF VARIABLE LENGTH N UNITS AND STORING SECOND POINTERS WITHIN THE INITIAL SECTOR OF THE N UNIT

FIELD OF THE INVENTION

This invention relates generally to information storage apparatus and methods and, in particular, to data storage apparatus and methods that employ compressed data.

BACKGROUND OF THE INVENTION

Data compression is employed to increase the amount of data that can be stored on a mass storage medium, such as a disk, thereby decreasing the ratio of storage unit cost per unit of customer data. Incidently, the use of data compression may also improve the performance of the disk. It is expected that existing and future low cost hardware implementations of data compression algorithms will be attractive to many users, and that the use of data compression will become more widespread.

When data compression is used with disk-based products, conventional practice divides the data being compressed into equal size compression units. Typically, the compression/ decompression hardware operates only upon full compression units. That is, it is not possible to retrieve (read) a particular data element from the compression unit unless all of the data preceding the data element in the compression unit is first decompressed by the compression/ decompression hardware. When saving a data element, the entire compression unit containing that element is compressed by the compression/decompression before it is saved on the disk. As can be appreciated, when performing small reads (e.g., reads of data elements such as single records) that are considerably smaller than a compression unit, inefficiencies are experienced.

Furthermore, the compression factor (ratio) of a given compression unit is data dependent. As a result, two compression units (having the same uncompressed length) may yield compressed images of different length. In order to use all the disk space, compressed images are stored consecutively on the disk. Thus, to enable direct access, the location of a compression unit is stored in a directory having a size that is proportional to the number of compression units. For performance reasons the directory is preferably implemented with a fast (and relatively expensive) control memory. As a result, there is strong cost and performance incentive to make the compression units large.

However, one major performance drawback of data compression-oriented mass storage systems, in particular disk systems, is the required connection time and the response time for small read operations, such as record reads. Conventional approaches to solving or at least ameliorating this problem require additional control information, and therefore consume a significant amount of control memory space. If the control memory space is implemented with semiconductor memory then additional cost, packaging volume, and power consumption are experienced.

It is thus an object of this invention to provide a method that reduces connection time during record read operations while adding but a small amount of information to the directory, relative to that required when using smaller size compression units.

It is a further object of this invention to reduce both the connection time and the response time experienced during small read operations from compressed disk tracks, while not significantly increasing the amount of additional control information.

SUMMARY OF THE INVENTION

This invention teaches a novel usage and management of a combination of data structures in both a directory and the disk itself, rather than the use of more entries in only the directory. The use of the technique of this invention results in a reduced requirement for additional directory memory over a technique that would reduce the size of each compression unit.

As such, the foregoing and other problems are overcome and the objects of the invention are realized by a method for operating a data storage system that is comprised of at least one disk. The method includes a step of partitioning a data compression unit into n basic compression units, where n is greater than one. Each data compression unit is comprised of a plurality of disk sectors and each of n basic compression units begins with a different initial sector. A next step partitions the data compression unit into X intervals, where X is less than n. Each of the X intervals begins with a different initial sector and within one of the n basic compression units. Further steps of the method include storing, external to the at least one disk, a plurality of first pointers each of which points to the initial sector of one of the n basic compression units wherein the 1/X, 2/X, . . . , (X−1)/X intervals begin; storing, within each of the initial sectors of the individual ones of the n basic compression units wherein the 1/X, 2/X, . . . , (X−1)/X intervals begin, a second pointer to the initial sector of the interval that begins within the basic compression unit; and, in response to a disk read operation that reads a compressed data unit that begins with one of the sectors that is located within one of the X intervals, accessing the beginning sector of the compressed data unit in accordance with one of the first pointers and one of the second pointers.

The beginning sector for the compressed data unit is referred to as a sector of interest (SOI), and the step of accessing includes the steps of using the first pointer to determine the initial sector of a target basic compression unit wherein an interval begins that includes the SOI; beginning reading compressed data from the at least one disk at the initial sector of the target basic compression unit; decompressing the read data to determine the value of second pointer; and discarding the decompressed data until the initial sector of the interval that contains the SOI is reached.

The compression unit typically includes at least one compressed record that is comprised of a plurality of sectors, and the step of accessing includes an initial steps of allocating a number of sectors to store the compressed record by estimating a required number of sectors based on a predetermined data compression ratio. The step of allocating includes a step of determining an actual compression ratio for the record, determining a value of a longest run of identical characters within the record, and adjusting the actual compression ratio based on the value of the longest run of identical characters. The step of allocating includes a step of adding at least one additional sector to the estimated number to enable the compressed record to be subsequently updated in place without requiring the compressed record to also be rewritten to a different area of the disk.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
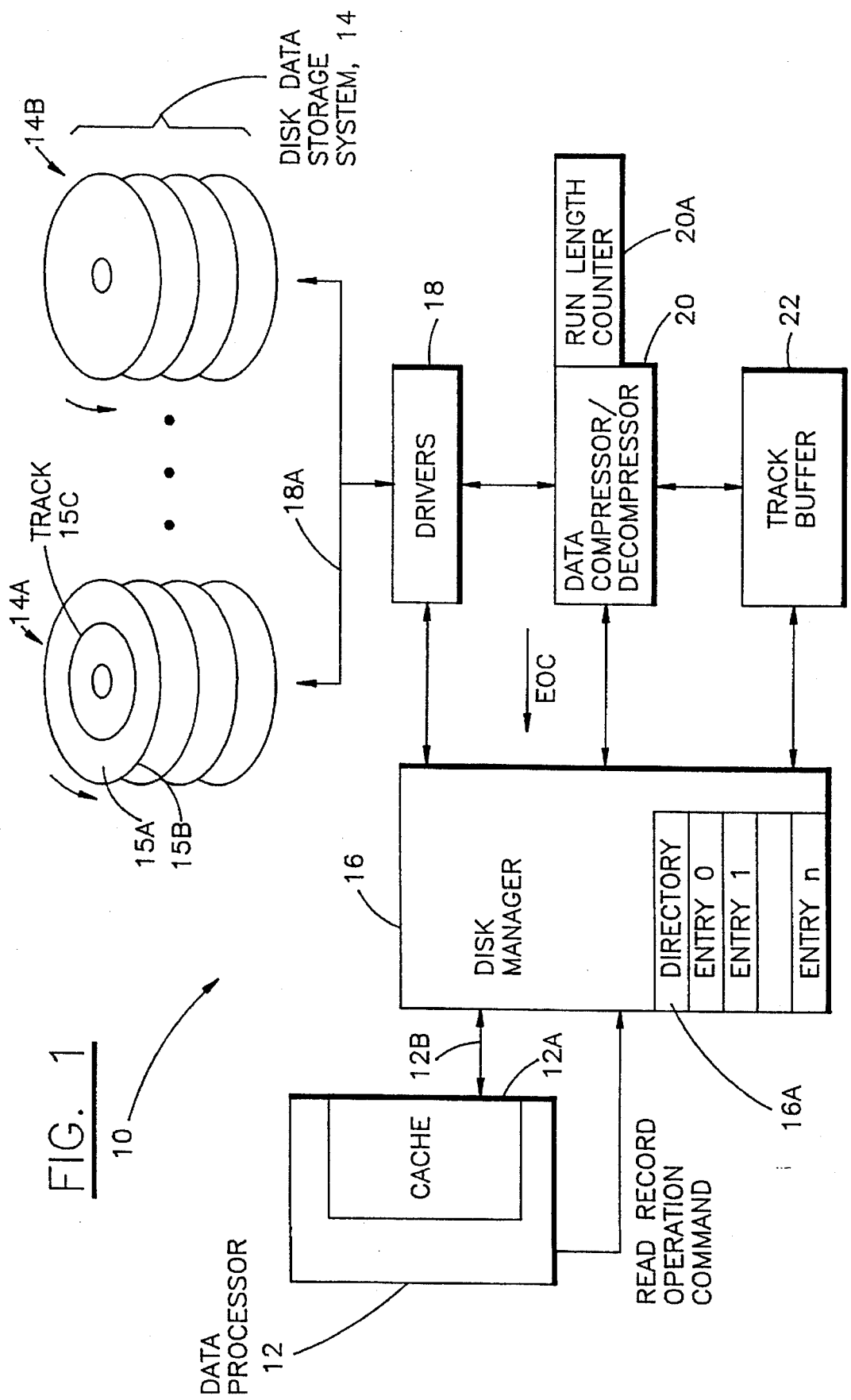
FIG. 1 is a block diagram illustrating a data processing system that is constructed and operated in accordance with this invention.

Reference is made to the block diagram of FIG. 1 for showing a data processing system 10 that is constructed and operated in accordance with this invention. System 10 includes a data processor 12 having an associated cache memory 12a. The cache memory 12a may be comprised of non-volatile storage (NVS) devices. Bidirectionally coupled to the data processor 12 and, more particularly, the cache memory 12a is a data path 12b and an associated disk data storage system 14. The disk data storage system 14 may comprise from one disk unit to a plurality of disk units. For example, in the illustrated embodiment the disk data storage system 14 is comprised of a first disk unit 14a and a second disk unit 14b. Each disk unit may comprise from one to n individual disks each having a first data storage surface 15a and a second data storage surface 15b. Each surface is partitioned into a plurality of tracks 15c in a conventional manner.

In a presently preferred embodiment of this invention the disk data storage system 14 is organized and operated as a RAID system that is somewhat similar to the RAID3 or RAID5 system described by D. A. Patterson, G. Gibson, and R. H. Katz in an article entitled "A Case for Redundant Arrays of Inexpensive Disks (RAID)", ACM SIGMOD Conference, Chicago, Ill., Jun. 1–3, 1988, pages 109–116. An advantage of the RAID approach is that it enables the disk subsystem of a data processor to keep pace with the continuing improvements in processor speed and main memory density.

In this publication five different levels of RAID are discussed. Level one employs mirrored disks (full redundancy of all disks, both data and check disks), level 2 employs a hamming code for the error correction information to reduce the number of check disks, level 3 employs a single check disk per group of data disks, level 4 employs independent read/write operations wherein the individual transfer information is contained within a single disk unit and is not spread across several disks, and level 5 (RAID5) spreads both the data and the data integrity (parity) information across all disks, including the check disk.

It should be realized that the use of RAID-type of disk data storage system is not to be construed as a limitation upon the practice of this invention.

The system 10 further includes a disk manager 16 that operates in accordance with the teaching of this invention. Coupled between the disk data storage system 14 and the disk manager 16 are the necessary disk device drivers 18. The drivers 18 interact with the disk units 14a and 14b at a low level so as to enable the disk units to be read and written. The understanding of the functioning of the drivers 18 is not germane to an understanding of this invention. As an example only, the disks 14a and 14b, and the drivers 18, may all be connected through a bus 18a such as a well known SCSI bus.

The disk manager 16 includes or has access to a directory 16a having a plurality of entries ($Entry_o$–$Entry_n$) corresponding to individual ones of n compression units.

The system 10 further includes a suitable data compressor/decompressor 20 and an associated track buffer 22. The track buffer 22 stores uncompressed data that is to be written to the storage system 14 via the data compressor 20 and drivers 18, or that is read from the storage system 14 via the drivers 18 and the data decompressor 20. A run length counter 20a is associated with the data compressor/decompressor 20, the use of which is described in detail below.

In the embodiment herein described it is assumed that a disk track 15c (for example, 48 kbytes) corresponds to one compression unit. It should be understood, however, that the teaching of this invention is applicable to compression units having a different size.

When a conventional read operation is performed, all of the data that precedes a record of interest on the track (compression unit) is decompressed before the record of interest is decompressed. Therefore, and assuming a compression ratio of 2:1, on average 0.25 disk revolutions are needed for reading data before reaching the record (following 0.5 revolutions for orienting to the beginning of the track). In these 0.25 revolutions, the disk 14a or 14b is connected and data transfer resources are dedicated for the read operation. Thus, connection time in compression oriented disk systems for small read operations is significantly larger than the equivalent connection time in systems that do not use compression. Moreover, the response time for small read operations (determined primarily by the seek and latency duration) is degraded in compression oriented disk systems.

It is noted that if the disk system requires the transfer of a track to buffer 22 (or cache 12a) once a record in that track is referenced, the aggregated connection time in compression-oriented disk systems is not increased. However, the response time of these systems for small read operations is degraded.

Figure 2:
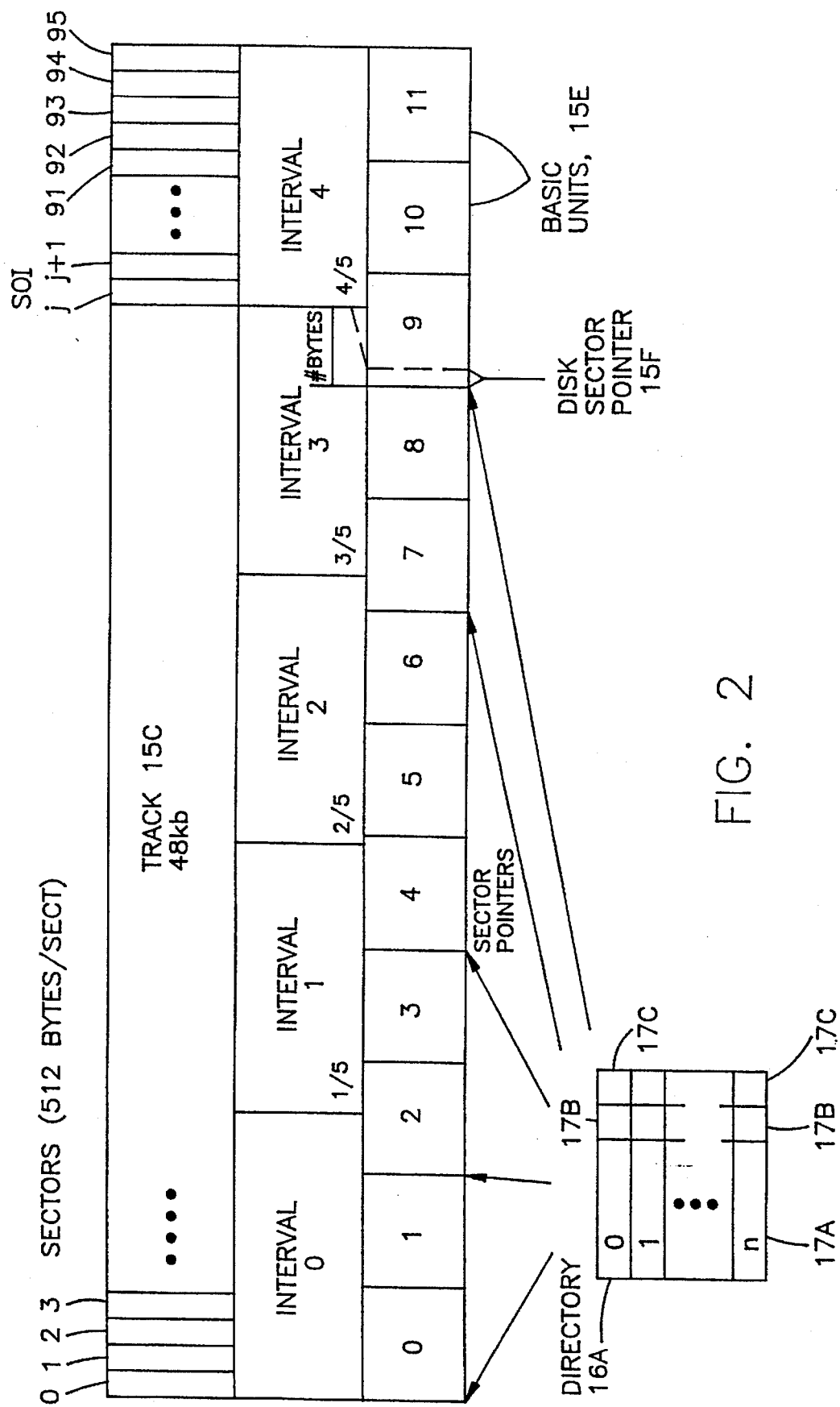
FIG. 2 illustrates a partitioning of a compression unit in accordance with this invention.

Reference is now made to FIG. 2 for illustrating a presently preferred logical organization for the track 15c and the directory 16a. It is assumed that the track 15c is partitioned into a plurality of sectors. As an example, if each sector is 512 bytes in length, then a 48 kbyte track includes 96 sectors. In FIG. 2 the sectors are not drawn to scale, relative to the track 15c.

The method of this invention operates to decompress every compression unit to some whole number of equal size (4 kbyte) compressed basic units 15e rather than to one single track-length compressed image. For a 48 kbyte track (compression unit) 15c, there are a total of 12, 4 kbyte basic units 15e.

In accordance with this technique there is only one field 17b of each entry in the directory 16a that points to the first basic unit 15e of the compression unit. Thus, no additional directory entries are required, and the above described division is not equivalent to increasing the number of compression units.

For implementation simplicity, it is preferred that each basic unit 15e equal an integral number of physical disk sectors (blocks).

The method of this invention also provides additional control structures in both the directory 16a and in each of the basic units 15c. An additional directory control structure (field 17c) is added to the information fields 17a of each directory entry to enable the direct access to records in compressed tracks. The field 17c stores pointers that point to addresses-within the basic units 15e. Hereafter, these pointers are denoted as sector pointers. Every sector pointer points to a basic unit 15e that contains a predefined sector in the compression unit. The compression unit is divided to X intervals 15d, and X−1 sector pointers in every directory entry (field 17c) point to those X−1 basic units that contain the sectors that mark the beginning of the 1/X, 2/X, ..., (X−1)/X parts of the track. In the presently preferred embodiment of this invention a compression unit is partitioned into five intervals 15d, and four sector pointers in the field 17c of every directory entry point to the initial sector addresses (vol., cylinder, surface, sector) of the basic units 15e wherein the 1/5, 2/5, 3/5 and 4/5 intervals start. In the illustrated example, the sector pointers stored in the field 17c point to the initial sectors of the basic units 2, 4, 7, and 9. Instead of storing the absolute address of the basic unit, each sector pointer stores the offset (in sectors) of the pointed at basic unit from the previously pointed at basic unit. As was noted previously, the absolute address of the first basic unit 15e is stored in the field 17b in each directory entry.

It should be understood that the partitioning of the compression unit into five intervals 15d is not a limitation upon the practice of this invention, and that more or less intervals may be used.

If it is assumed that none of the five intervals 15d in the 48 kbyte track 15c expands significantly by the data compression process, then two bits (for a range of 0-3) are sufficient for every sector pointer. As a result, the field 17c can be accommodated by the addition of only one byte (2 bits×4 sector pointers) to each entry of the directory 16a. If the sectors pointed to by two (or more) sector pointers reside in the same basic unit 15e, the sector pointer value for the second (or subsequent) pointer is set to zero.

If one (or more) of the intervals 15d in the track 15c expands significantly, the latency reduction achieved by this method degrades slightly, but the operation of the method is not impaired.

In addition to the single field 17c that is added to each directory entry, a data structure, referred to as a disk sector pointer 15f, is added to the disk to enable the transfer data from a specific location in the disk corresponding to a predefined location in the uncompressed track. This is accomplished even though the disk initiates data transfer from a location whose corresponding uncompressed location in unknown.

More particularly, a disk sector pointer 15f that points to the location of a predefined sector in the compression unit is added to those disk sectors that correspond to the initial sector of every basic unit 15e. The disk sector pointer 15f stores a distance from the beginning of the basic unit 15e to the beginning of one of the intervals 15d in the compression unit. In accordance with the example illustrated in FIG. 2, the disk sector pointer 15f stores the distance from the beginning of the basic unit 15e to the beginning of either the 1/5, 2/5, 3/5 or 4/5 intervals of the track. If more than one of these intervals are in the same basic unit 15e, the disk sector pointer 15f points to the first of the intervals. If none of the 1/5, 2/5, 3/5 or 4/5 intervals is located in the basic unit, the value of the disk sector pointer 15f is undefined and is not used. The distance stored in the disk sector pointer 15f is given in uncompressed units (i.e. a number of uncompressed bytes).

The disk sector pointer 15f requires, by example, two bytes for expressing values in the range of 0–9600. Thus, for every track a total of 12 bytes (assuming a 2:1 compression ratio) are dedicated for storing the disk sector pointers 15f, and the total amount of data for the disk is similar to the size of the directory. However, the disk memory is significantly less expensive than directory memory.

The additional data structures supporting the method of this invention are initialized when a track is written to the disk storage system 14. The track to be written is sent to the disk through the track buffer 22 and the data compression/decompression unit 20. The unit 20 compresses the data to several basic units 15e. If a sector pointed to by one of the sector pointers contained in the field 17c of the corresponding directory entry is transferred through the compression/decompression unit 20, the corresponding sector pointer is set to point to the basic unit 15e that is generated by the compression/decompression unit 20.

Whenever a new basic unit 15e is generated, the disk sector pointer 15f is set to the distance (in uncompressed units) between the first byte that will be sent to the basic unit 15f and the next sector that should be pointed to (i.e. the predetermined 1/5, 2/5, 3/5, 4/5 intervals of the track 15c).

A Record Read Operation command that is generated by the data processor 12 requires that data from a specific sector (beginning of record) to another sector (end of record) be transferred (using decompression) from the disk storage system 14 to the track buffer 22. Hereafter, the initial sector of a record to be read is designated as a Sector of Interest (SOI).

Figure 3:
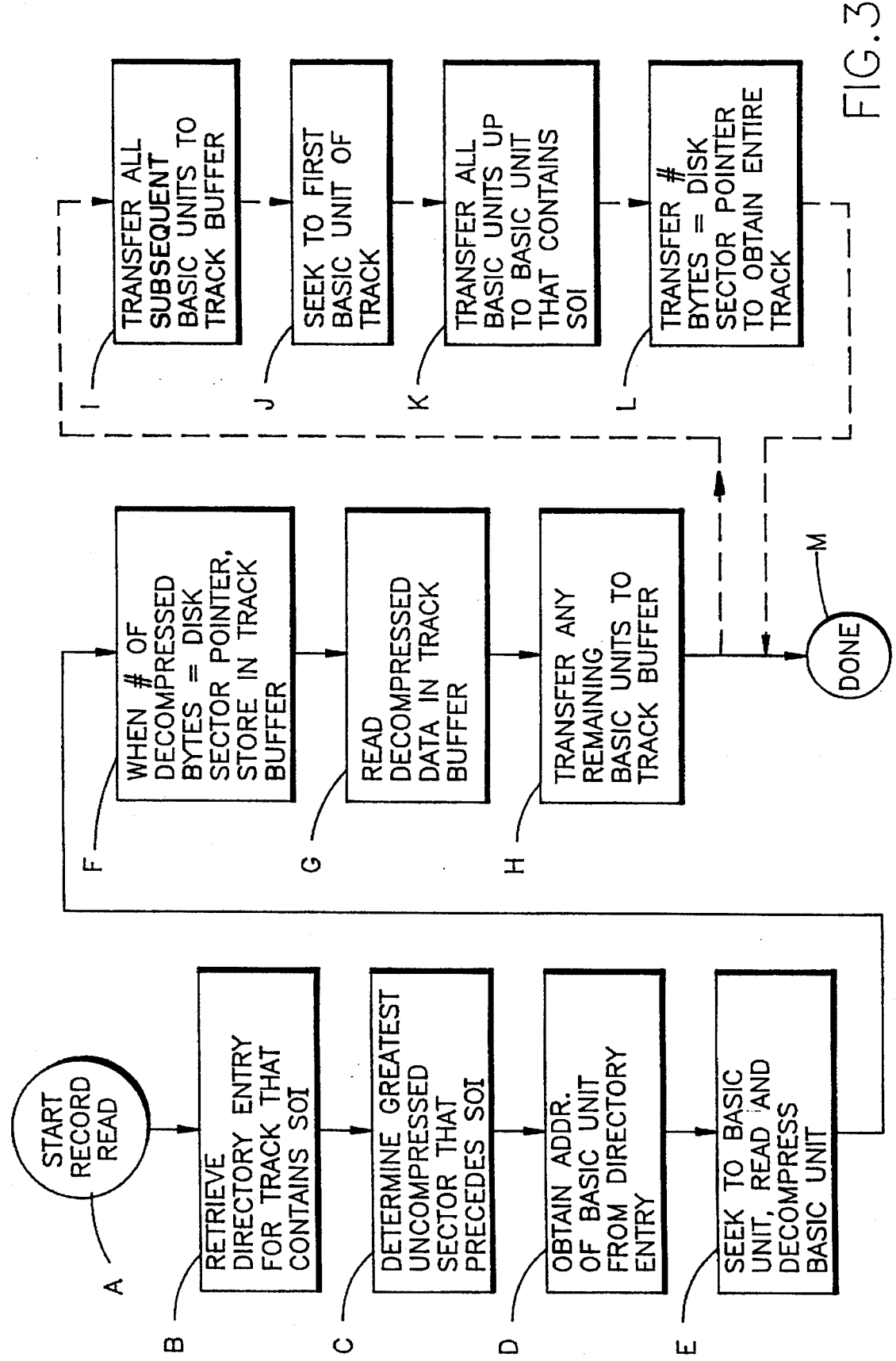
FIG. 3 is logic flow diagram that illustrates a presently preferred method of this invention.

Referring now to FIG. 3, the following steps are performed during a Record Read Operation.

A. A Record Read Operation is initiated by the data processor 12.

B. Based on the SOI, the disk manager 16 searches the directory 16a and the directory entry corresponding to the track that contains the SOI is retrieved from the directory 16a.

C. The greatest uncompressed sector that is pointed to by one of the sector pointers, and that precedes the SOI, is determined.

D. The address of the basic unit 15e which is pointed to by the sector pointer (field 17c) pointing to the uncompressed sector determined above is retrieved from the directory entry. By example, and referring to FIG. 2, if the SOI is j+1, the address (initial sector) of basic unit 9 is retrieved.

E. The disk is instructed to seek to the initial sector of the basic unit 9 as retrieved above. When the disk reaches the basic unit 9, the compression/decompression unit 20 begins to read and decompresses the basic unit 9, and the value stored in the disk sector pointer 15f is determined. However, until the number of bytes indicated by the disk sector pointer 15f are decompressed, the decompressed data is not sent to the track buffer 22 but is instead simply discarded.

F. After the number of bytes indicated by the disk sector pointer 15f are decompressed, the remaining data in the basic unit 15e, that is the data that corresponds to the beginning portion of the interval 4, is decompressed and is sent to the track buffer 22.

G. When the SOI is stored in the track buffer 22, the Read Record Operation may proceed with the decompressed data that is stored in the track buffer 22.

H. The remaining basic units 15e, if any, that contain part of the record requested by the Record Read Operation are decompressed and transferred to the track buffer 22.

The following steps are performed if the disk system 14 is of a type that requires the transfer of an entire track to the track buffer 22 once a record in that track is referenced.

I. The remaining basic units that follow the basic unit containing the SOI, and were not transferred in step H, are transferred to the track buffer 22. In FIG. 2 this would be the basic units 10 and 11.

J. Following the transfer of the last basic unit 15e (basic unit 11) that belongs to the track 15c that contains the SOI, the disk is instructed to seek to the first basic unit (basic unit 0) that belongs to the track 15c that contains the SOI.

K. When the disk reaches the basic unit 0, all of the basic units from the basic unit 1 up to the basic unit 9 that contains the SOI are decompressed and transferred to the track buffer 22.

L. Data is then transferred to the track buffer 22 from the initial sector of the basic unit 9, that contains the start of the interval that includes the SOI, until the number of decompressed bytes received by the track buffer 22 is equal to the number of bytes indicated by the disk sector pointer 15f of the basic unit 9. In this manner the entire track is stored in the track buffer 22.

M. The Read Record operation is terminated.

It can be appreciated that an alternative solution to that described above, that would reduce to the same degree both the connection time and the response time for small record read operations, and that required additional directory entries, would result in a directory that is as much as six times larger (assuming a 2:1 compression ratio) than the directory 16a. Assuming that an entry size in the directory 16a is no less than two bytes, such a alternative solution implies an increase by an order of magnitude in directory size over the requirements of the method of this invention.

As a result of the Record Read Operation that was described above the data processor 12 may revise or update the contents of the record, as commonly occurs during database operations. However, the updated record, when compressed before being written back to the disk storage system 14, may require more storage space than the original record. This presents a problem for sequentially written records, in that the revised record may be required to be stored at another location, thereby adversely impacting disk performance for subsequent reads of sequential records.

When a database record is first allocated for storage in the disk storage system 14 it is provided with unused space to accommodate the subsequent growth of the record. By example, the unused part of the record may padded with hexadecimal zeros.

Other than for the first update of the record, the amount of change in the size of the compressed record is typically small. As a result, and in accordance with a further aspect of this invention, if the original record is allocated more space than the expected compression size for the first update, then the probability is increased that the record can be subsequently updated in place without requiring the updated record to be rewritten to a different region of the disk.

In order to make this estimate, it is necessary to account for the unused space that is padded with "blank" characters in the originally-created record. That is, the $00_{16}$ padding characters typically compress at a much higher ratio (for example, 96:1) than does "normal" data (for example, 3.6:1). The above-mentioned runlength counter 20a is employed for this purpose.

The runlength counter 20a is a 24-bit counter that stores, at the completion of the compression of a compression unit, a value (in bytes) of the longest run of repeating bytes in the compression unit. As an example, in the string "xxxyaaaa" the runs are:
xxx, runlength=3;
y, runlength=1; and
aaaa, runlength=4.

After the compression of the string "xxxyaaaa" the runlength counter 20a would contain the value 4, corresponding to the string "aaaa". The content of the runlength counter 20a can be read by an I/O operation from the data processor 12. Also, the content of the runlength counter 20a can be automatically appended to an end of compression (EOC) signal that is sent to the host device (e.g., data processor 12) at the completion of a compression operation.

At the termination of the compression of the compression unit that includes the new record the value of the runlength counter 20a reflects the number of the padding characters that comprise the record, in that the padding characters are assumed to comprise the longest run of identical characters. The value stored in the runlength counter 20a is thus employed to adjust the actual data compression ratio for the record to a value that reflects the compressed size that the record will assume when it is updated and the padding characters overwritten with actual data. By example, if it is determined from the runlength counter 20a that the record was comprised of 20% padding characters, and if the padding characters are known to compress at a ratio of, by example, 96:1, then the expected compression ratio is adjusted based on an assumption that the 20% padding character portion is replaced with actual data that compresses at, by example, 3.6:1. Having made the adjustment to the record, a first amount of disk space that must be set aside for the (adjusted) compressed record is determined. Next, an additional amount of disk space (for example, 5%) is then added to enable the record to be updated in place, and logical record additions to occur, after the first update occurs.

It is noted that it is within the scope of this invention to operate the system 10 as a log-structured file system of a type that is described by M. Rosenblum and John K. Ousterhout in an article entitled "The Design and Implementation of a Log-Structured File System", ACM Transactions on Computer Systems, Vol. 10, No. 1, February 1992, pages 26–52.

While the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. A method for operating a data storage system that is comprised of at least one disk, comprising the steps of:

partitioning a data compression unit into n basic compression units, where n is greater than one, each data compression unit being comprised of a plurality of disk sectors and each of n basic compression units beginning with a different initial sector;

partitioning the data compression unit into X intervals, where X is less than n, each of the X intervals beginning with a different initial sector and within one of the n basic compression units;

storing, external to the at least one disk, a plurality of storing, external to the at least one disk, a plurality of first pointers each of which points to the initial sector of one of the n variable length basic compression units wherein the 1/X, 2/X, . . . , (X–1)/X intervals begin;

storing, within each of the initial sectors of the individual ones of the n variable length basic compression units wherein the 1/X, 2/X, . . . , (X–1)/X intervals begin, a second pointer to the initial sector of the interval that begins within the basic compression unit; and in response to a disk read operation that reads a compressed data unit that begins with one of the sectors that is located within one interval, accessing the beginning sector of the compressed data unit within the one interval in accordance with one of the first pointers and one of the second pointers, said one of the second pointers decompressed after being accessed in accord with a first pointer, to enable identification of said beginning sector of said compressed data unit.

2. A method as set forth in claim 1 wherein the data compression unit corresponds to one track of the at least one disk.

3. A method as set forth in claim 1 wherein each of the first pointers is stored as an offset, in sectors, from a previous first pointer.

4. A method as set forth in claim 1 wherein each of the second pointers is stored as a number of bytes from the start of the initial sector of the basic compression unit wherein an interval begins to the initial sector of the interval that begins within the basic compression unit.

5. A method as set forth in claim 1 wherein the first step of storing also stores, external to the at least one disk, a third pointer to an initial sector of the compression unit.

6. A method as set forth in claim 1 wherein the beginning sector for the compressed data unit is a sector of interest (SOI), and wherein the step of accessing includes the steps of:

using the first pointer to determine the initial sector of a target basic compression unit wherein an interval begins that includes the SOI;

beginning reading compressed data from the at least one disk at the initial sector of the target basic compression unit;

decompressing the read data to determine the value of the second pointer; and discarding the decompressed data until the initial sector of the interval that contains the SOI is reached.

7. A method as set forth in claim 6 and including a further step of reading and decompressing the SOI and any other sectors that comprise the compressed data unit.

8. A method as set forth in claim 7 and further including the steps of:

reading and decompressing all of the sectors from the SOI to the end of the compression unit;

seeking to the initial sector of the compression unit; and reading and decompressing all of the sectors from the initial sector up to the SOI.

9. A method as set forth in claim 1 wherein the compression unit includes at least one compressed record comprised of a plurality of sectors, and further including the steps of:

allocating a number of sectors to store the compressed record by estimating a required number of sectors based on a predetermined data compression ratio, the step of allocating including a step of determining an actual compression ratio for the record, determining a value of a longest run of identical characters within the record, and adjusting the actual compression ratio based on the value of the longest run of identical characters.

10. A method as set forth in claim 9 wherein the step of allocating includes a step of adding at least one additional sector to the estimated number to enable the compressed record to be subsequently updated without requiring the compressed record to also be re-written to a different area of the at least one disk.

11. A data storage system having at least one disk, comprising:

a disk manager for partitioning a data compression unit into n variable length basic compression units, where n is greater than one, each data compression unit being comprised of a plurality of disk sectors and each of n variable length basic compression units beginning with a different initial sector, said disk manager further partitioning the data compression unit into X intervals, where X is less than n, each of the X intervals beginning with a different initial sector and within one of the n variable length basic compression units;

means for storing, external to the at least one disk, a plurality of first pointers each of which points to the initial sector of one of the n variable length basic compression units wherein the 1/X, 2/X, ..., (X−1)/X intervals begin;

means for storing, within each of the initial sectors of the individual ones of the n variable length basic compression units wherein the 1/X, 2/X, ..., (X−1)/X intervals begin, a second pointer to the initial sector of the interval that begins within the basic compression unit; and said disk manager is responsive to a disk read operation that reads a compressed data unit that begins with one of the sectors that is located within one interval, and further including means for accessing the beginning sector of the compressed data unit in accordance with one of the first pointers and one of the second pointers, said one of the second pointers being decompressed after being accessed in accord with a first pointer, to enable identification of said beginning sector of said compressed data unit.

12. A data storage system as set forth in claim 11 wherein the data compression unit corresponds to one track of the at least one disk.

13. A data storage system as set forth in claim 11 wherein each of the first pointers is stored as an offset, in sectors, from a previous first pointer.

14. A data storage system as set forth in claim 11 wherein each of the second pointers is stored as a number of bytes from the start of the initial sector of the basic compression unit wherein an interval begins to the initial sector of the interval that begins within the basic compression unit.

15. A data storage system as set forth in claim 11 wherein said storing means also stores, external to the at least one disk, a third pointer to an initial sector of the compression unit.

16. A data storage system as set forth in claim 11 wherein the beginning sector for the compressed data unit is a sector of interest (SOI), and wherein said accessing means uses the first pointer to determine the initial sector of a target basic compression unit wherein an interval begins that includes the SOI to begin reading compressed data from the at least one disk at the initial sector of the target basic compression unit; and further comprising means for decompressing the read data to determine the value of the second pointer to discard the decompressed data until the initial sector of the interval that contains the SOI is reached, and for then reading and decompressing the SOI and any other sectors that comprise the compressed data unit.

17. A data storage system as set forth in claim 16 wherein said accessing means further reads and decompresses all of the sectors from the SOI to the end of the compression unit; and includes means for seeking to the initial sector of the compression unit and for then reading and decompressing all of the sectors from the initial sector up to the SOI.

18. A data storage system as set forth in claim 11 wherein the compression unit includes at least one compressed record comprised of a plurality of sectors, and wherein said disk manager further comprises means for allocating a number of sectors to store the compressed record by estimating a required number of sectors based on a predetermined data compression ratio, including means for determining an actual compression ratio for the record, means for determining a value of a longest run of identical characters within the record, and means for adjusting the actual compression ratio based on the value of the longest run of identical characters.

19. A data storage system as set forth in claim 18 wherein said allocating means further includes means for adding at least one additional sector to the estimated number to enable the compressed record to be subsequently updated without requiring the compressed record to also be re-written to a different area of the at least one disk.

* * * * *

UNITED STATES PATENT AND TRADEMARK OFFICE
CERTIFICATE OF CORRECTION

PATENT NO. : 5,644,791
DATED : July 1, 1997
INVENTOR(S) : Brady et al

It is certified that error appears in the above-identified patent and that said Letters Patent is hereby corrected as shown below:

Column 8, cancel line 56

Signed and Sealed this

Thirty-first Day of March, 1998

Attest:

BRUCE LEHMAN

*Attesting Officer*  *Commissioner of Patents and Trademarks*